(12) United States Patent
Steinlage et al.

(10) Patent No.: US 12,283,070 B2
(45) Date of Patent: Apr. 22, 2025

(54) SYSTEM AND METHOD FOR DETECTING TRUCK DAMAGE

(71) Applicant: Caterpillar SARL, Geneva (CH)

(72) Inventors: Justin Lee Steinlage, Mackinaw, IL (US); Christopher R. Wright, Peoria, IL (US)

(73) Assignee: Caterpillar SARL, Geneva (CH)

( * ) Notice: Subject to any disclaimer, the term of this patent is extended or adjusted under 35 U.S.C. 154(b) by 380 days.

(21) Appl. No.: 17/829,560

(22) Filed: Jun. 1, 2022

(65) Prior Publication Data
US 2023/0394710 A1   Dec. 7, 2023

(51) Int. Cl.
*G06T 7/00*   (2017.01)
*G07C 5/08*   (2006.01)

(52) U.S. Cl.
CPC .............. *G06T 7/97* (2017.01); *G07C 5/0808* (2013.01); *G06T 2207/30248* (2013.01)

(58) Field of Classification Search
CPC ............ G06T 7/97; G06T 2207/30248; G07C 5/0808; E02F 9/205; E02F 9/267; G01N 21/8851; G01N 21/9515; G06V 10/82; G06V 20/52; G06V 20/64
USPC ......................................................... 382/103
See application file for complete search history.

(56) References Cited

U.S. PATENT DOCUMENTS

| 10,473,594 B2 | 11/2019 | Heikkilä et al. |
| 2006/0114531 A1* | 6/2006 | Webb ................. G01N 21/8851 359/15 |
| 2009/0290757 A1 | 11/2009 | Mian et al. |
| 2015/0149049 A1 | 5/2015 | Bewley et al. |
| 2016/0237657 A1 | 8/2016 | Carpenter et al. |
| 2018/0038805 A1* | 2/2018 | Heikkilä ................. G01S 17/06 |
| 2020/0325655 A1 | 10/2020 | Hageman et al. |

FOREIGN PATENT DOCUMENTS

| BR | PI0901912 A2 | 2/2011 |
| CN | 105445276 A | 3/2016 |
| CN | 207802177 U | 8/2018 |
| CN | 212872940 U | 4/2021 |
| EP | 3754603 A1 | 12/2020 |
| JP | 2007322173 A | 12/2007 |
| JP | 2018179792 A | 11/2018 |
| WO | 0146668 | 6/2001 |
| WO | 2004058623 A1 | 7/2004 |
| WO | 2017160201 A1 | 9/2017 |

OTHER PUBLICATIONS

Written Opinion and International Search Report for Int'l. Patent Appln. No. PCT/EP2023/025248, mailed Sep. 4, 2023 (322 pgs).

* cited by examiner

*Primary Examiner* — Huy C Ho

(57) ABSTRACT

A system for detecting truck damage is disclosed. The system includes a work machine that has a detection unit located on the work machine. The detection unit is used to generate a first image data and a second image data of a loading area of a truck. A controller of the system is used to receive the first image data, generate a 3D objected from the first image data, and receive the second image data that is generated later in time that the first image data. After receiving the second image data, the controller updates the 3D object and detects any indication of damage between the generating of the first image data and the second image data to the loading area.

20 Claims, 5 Drawing Sheets

SYSTEM AND METHOD FOR DETECTING TRUCK DAMAGE

TECHNICAL FIELD

The present disclosure generally relates to a work machine control system, and more specifically, a work machine control system for detecting truck damage.

BACKGROUND

In construction, construction machines such as excavators and loader vehicles are typically utilized to remove earthen materials and load them onto trucks. In general, the truck backs into position near the excavator to be loaded with the materials, such as earthen materials or construction materials, excavated or dug up by the excavator. Sometimes, a loading area of a truck, including the sideboards and bed of the loading area, are damaged while loading the materials onto the trucks due to inadvertent contact with a shovel, or blade, of the excavator and the truck. The loading area of the truck may also be damaged from the materials dropped too hard during the loading process. However, Truck operators sometimes make claims and contribute damage to a truck that wasn't created by the excavator that is being implicated for causing the damage, and in fact, the damage was pre-existing or caused by a different loading vehicle.

U.S. Pat. No. 10,473,594 discloses an arrangement for inspecting a container and a method for inspecting a container. The arrangement is also directed to software and a device for carrying out the inspection. The method includes receiving image data on a container, verifying the location and position data of the image data in relation to the container, analyzing the received image data, and detecting possible damage points. The arrangement is also used generate a 3D object and a 3D indication of the damage points.

While effective, there remains a need for improved detection of damage on work machines, such as construction machines in the construction industries.

SUMMARY

In accordance with the present disclosure, a system for detecting truck damage is disclosed. The system includes a work machine that has a detection unit located on the work machine. The detection unit is used to generate a first image data and a second image data of a loading area of a truck. A controller of the system is used to receive the first image data, generate a 3D objected from the first image data, and receive the second image data that is generated later in time that the first image data. After receiving the second image data, the controller updates the 3D object and detects any indication of damage between the generating of the first image data and the second image data to the loading area.

In accordance with another aspect of the present disclosure, a work machine system is disclosed. The work machine system has a work machine that has a working tool that is movable to adjust a dig depth into a terrain during a dig cycle. The work machine also has a detection unit located on the work machine that is used to generate a first image data and a second image data of a loading area. The work machine system also has a truck that includes the loading area, and the loading area is used to receive earth material from the working tool. The work machine system further has a controller used to receive the first image data, generate a 3D object from the received first image data, receive the second image data generated later in time than the first image data, and update the 3D object with the second image data. After updating the 3D object, the controller may detect any indication of damage that occurred between the generating of the first image data and the second image data to the loading area.

In accordance with a further aspect of the present disclosure, a method of detecting damage to a loading area of a truck is disclosed. The method includes providing a work machine that has a detection unit disposed on the work machine used to generate a first image data and a second image data of the loading area of the truck, receiving at a controller the first image data, generating with the controller a 3D object from the received first image data, receiving at the controller the second image data that is generated later in time that the first image data, and updating with the controller the 3D object with the second image data. After updating the 3D object with the second image data, the controller may detect any indication of damage that occurred between the generation of the first image data and the second image data to the loading area.

These and other aspects and features of the present disclosure will be more readily understood when read in conjunction with the accompanying drawings.

DETAILED DESCRIPTION

Figure 1:
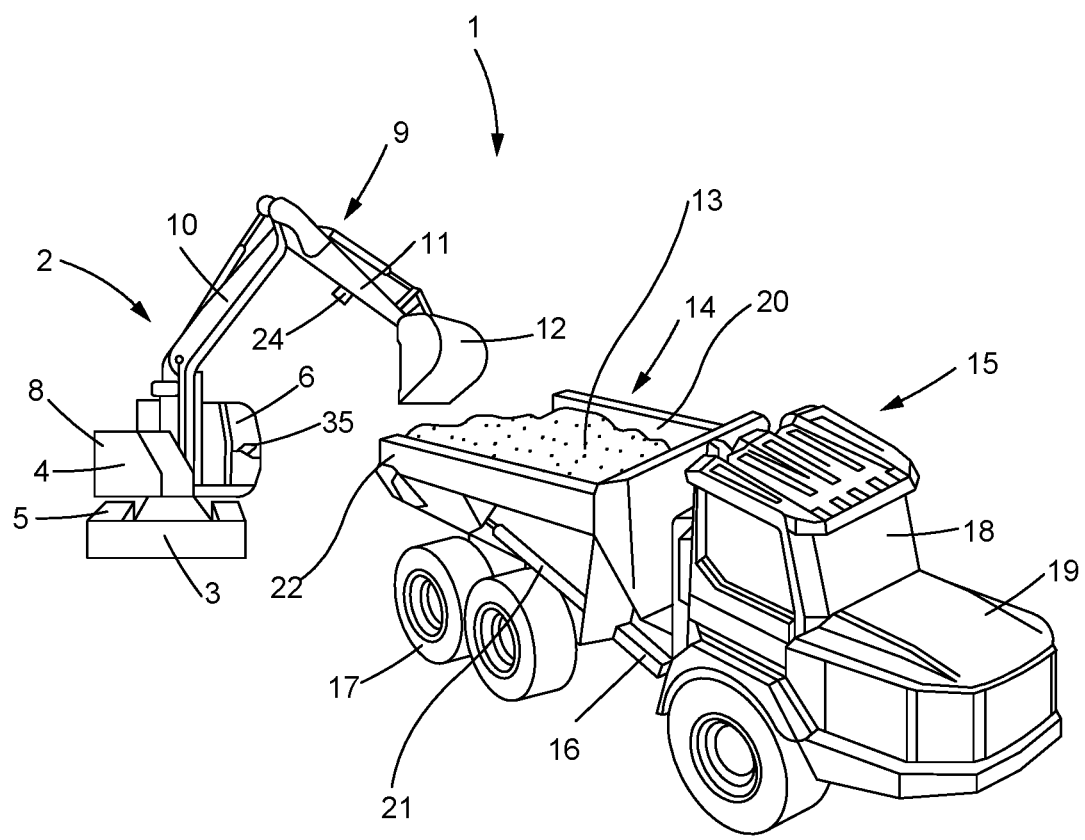
FIG. 1 is a diagrammatic perspective view an exemplary work machine system, in accordance with the present disclosure.

Referring to FIG. 1, a work machine system 1 is shown. The work machine system 1 may embody one or more fixed or mobile machines that performs some type of operation associated with an industry such as construction, mining, farming, transportation, or other industries known to utilize heavy equipment. For example, the work machine system 1 may include an earth moving machine such as an excavator, as shown, or a motor grader, backhoe, a dozer, a loader, a truck, or any other earth moving machine.

The work machine system 1, as shown as, includes a work machine 2, such as an earth scraper machine, bull dozer, hydraulic excavator, or the like. In the FIG. 1 embodiment, the work machine 1 includes a base frame 2 that supports a rotating frame 3 that is slewably attached to the base frame 3, and the rotating frame 4 being up to 360 degrees rotatable relative to the base frame 3. The base frame 3 is supported on a crawler-type lower traveling body 5, but in another exemplary embodiment, the traveling body 5 may support wheels or other movement supporting means. An operator cab 6 containing the operator controls 35 necessary to operate the work machine 2 is mounted on the rotating frame 4.

The rotating frame 4 has a motor 8, and in the present exemplary embodiment, an internal combustion engine such as a diesel engine is used as the engine as a power generation device, but in another exemplary embodiment, another power generation device is used such as an electric motor, hybrid motor, or the like. The motor 8 is used to power the movements of the work machine, such as powering the traveling body 5 to move the work machine 2 on a ground surface.

A working tool 9, such as a shovel attached to a boom or a blade, as shown in the FIG. 1 exemplary embodiment, is attached to the rotating frame 4. Specifically, the working tool 9 is raisably and lowerably attached to the rotating frame 4, and includes a boom 10 having an arm 11 that is pivotably attached to the distal end of the boom 10, and a bucket 12 that is pivotably attached to the distal end of the arm 11. The bucket 12 is able to dig or hold a predetermined held object, such as earthen materials or construction materials. The position of the boom 10, arm 11, and bucket 12 are controlled by a motor and hydraulic system (not shown), which includes the motor 8 and any hydraulic actuators, cylinders, and additional hydraulic motors (not shown) attached to the rotating frame 4, boom 10, arm 11, and bucket 12. More specifically, the motor and hydraulic system is able to raise and lower the boom 10 that is pivotably attached to the rotating frame 4, raise and lower the arm 11 that is pivotably attached to the boom 10, and raise and lower the bucket 12 that is pivotably attached to the arm 11.

FIG. 1 diagrammatic depiction of the work machine 2 performing excavation work, and specifically performing a loading operation. During the loading operation, the working tool 9 of the work machine 2 is movable to adjust a dig depth into a terrain during a digging cycle of the work machine 2. Specifically, the bucket 12, such as a bucket, shovel, or blade, is used to dig up materials 13, such as earthen or construction materials, and unload the dug up materials 13, referred to as the load, onto a loading area 14 of a truck 15. The truck 15 may be part of the work machine system 1, and may be a dump truck, semi-truck trailer, or any other vehicle or stationary area having a loading area 14 for receiving the load from the work machine 2.

The truck 15 of the work machine system 1 has a truck base 16 supported on a truck traveling body 17, such as wheels or treads, or any traveling body 17 commonly used to move a truck. The truck 15 has an open-box bed 20, in the FIG. 1 exemplary embodiment the bed 20 defining the loading area 14, for receiving the load, or materials 13, from the work machine 2. In one exemplary embodiment, the bed 20 is hinged at the rear of the bed 20 and equipped with hydraulic rams 21 to lift the front of the bed 20 allowing the load in the bed 20 to be deposited, or dumped, on the ground behind the truck 15 at the site of delivery. The bed 20 may also include sideboards 22 for holding in the load in the bed 20. The truck includes a truck cab 18 and a truck motor 19 for powering the truck traveling body 17 any hydraulics, such as the hydraulic rams 21.

The work machine system 1 also has a controller 23 (FIG. 3) that includes a detection unit 24 that is disposed on the work machine 1. The detection unit 24 may include one camera, or sensor, or include one or more cameras, or sensors, placed around the work machine 2, and is capable of simultaneous monitoring and capturing a predetermined field of view (or detection range), and the detection range extending up to 360 degrees of the area around the work machine 2. The detection unit 24 may be one or more 2D cameras, 3D stereo camera, a LiDar camera, an ultrasonic distance sensing sensor, or a millimeter-wave radar, or may include a combination of two or more of any of these cameras/sensors.

Figure 2:
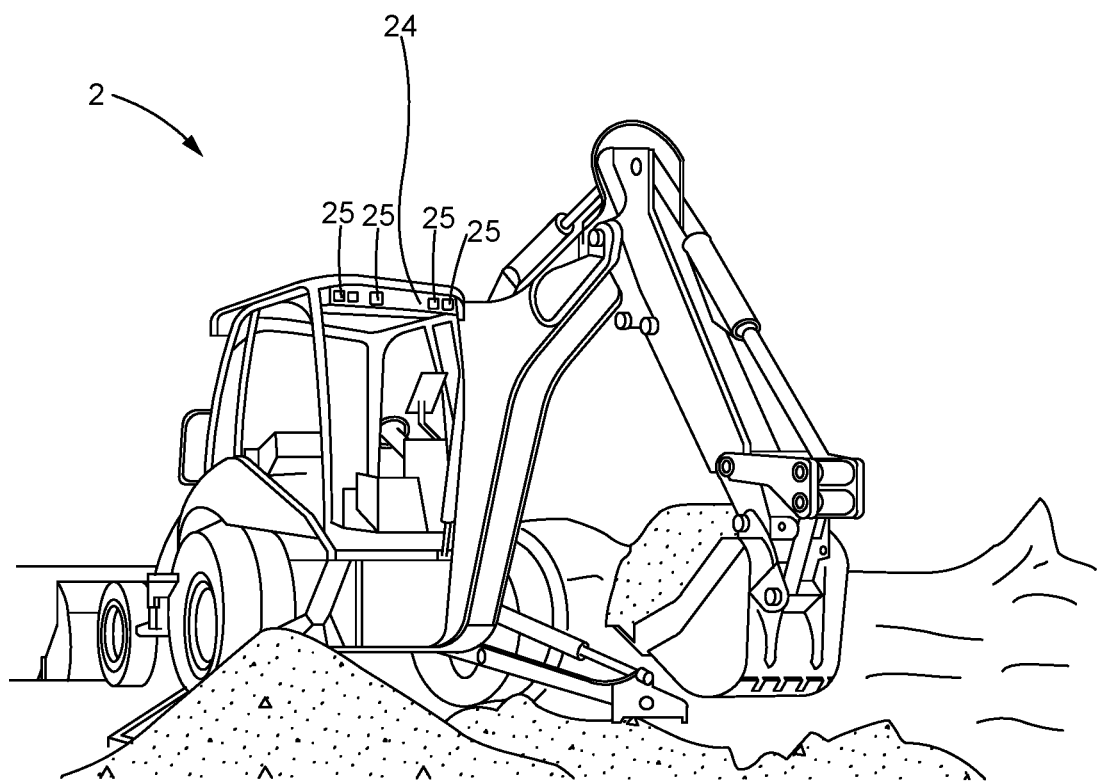
FIG. 2 is a front view of an exemplary work machine having a detection unit, in accordance with the present disclosure.

In the FIG. 1 exemplary embodiment, the detection unit 24 is located on the arm 11 of the boom 10. In this embodiment, the detection unit 24 is configured to capture image data of the truck 15 directly in front of the boom 10 during the loading operation. As best shown in FIG. 2, the detection unit 24, in another exemplary embodiment, is located on the work machine 2 on top of the operator cab 6, and is configured to capture image data in front of the work machine 2 of the truck 15. However, the detection unit 24 may be located anywhere on the work machine 2 that has a line of sight with the loading area 14. In the FIG. 2 embodiment, the detection unit includes one or more sensors 25 that comprise the detection unit, such as one or more 2D cameras, 3D stereo camera, a LiDar camera, an ultrasonic distance sensing sensor, or a millimeter-wave radar, or may include a combination of two or more of any of these cameras/sensors.

Figure 3:
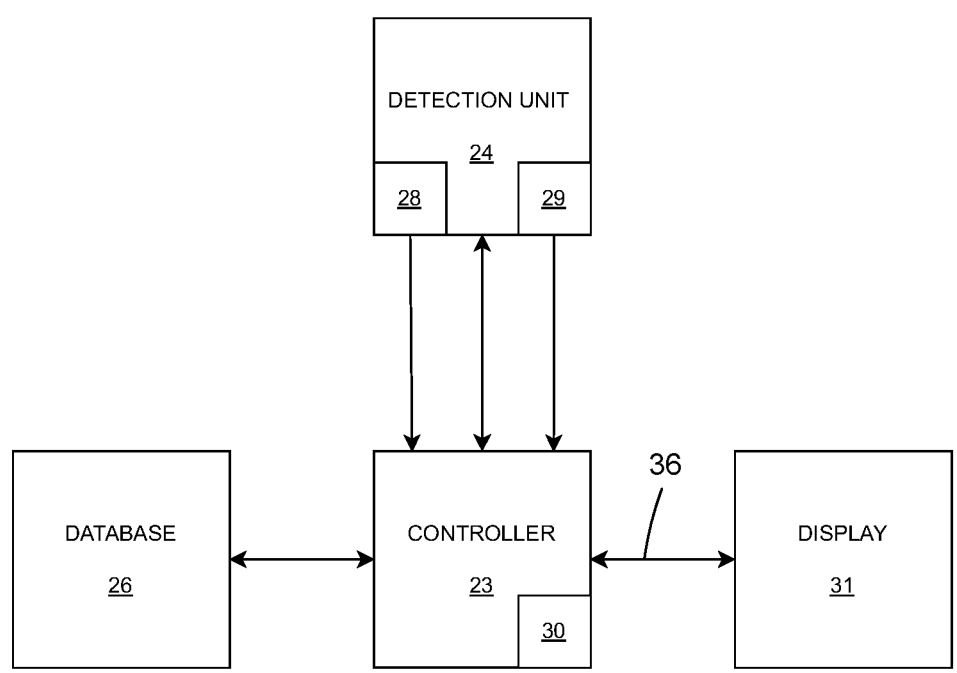
FIG. 3 is a block diagram of an exemplary work machine system, in accordance with the present disclosure.

In one exemplary embodiment, the detection unit 24 is a two-dimensional (2D) imaging sensor such as one or more 2D cameras (imaging cameras) mounted on the work machine 2. In this embodiment, the two-dimensional imaging sensors are used to detect and identify surface characteristics of the truck 15, and specifically the loading area 14 of the truck 15, within a viewing field of the detection unit 24. The 2D imaging cameras operate by projecting a wide light beam towards the loading area 14 and collect the reflected light reflected from the surfaces and objects (e.g., the loading area 14) within the viewing area at a receiver. In another exemplary embodiment, the imaging cameras may sweep a light beam across the loading area 14 in an oscillatory manner to collect line-wise image data, which is analyzed to identify the loading area 14. For example, the detection unit 24 may continuously capture picture frames of the loading area 24, and the controller 23 continuously processes the captured picture frames by comparing the captured picture frames to known images of the loading area 14 stored on a database 26 (FIG. 3). The database 20 may be a hard drive that is operatively connected to the controller 23 and located on the work machine 2, or may be a remote server that is wirelessly operatively connected to the controller 23. In another embodiment, the controller 23 processes images captured by the detection unit 24 using a neural network 27 (FIG. 3) to determine the loading area 14 is present in the generated image data.

Alternatively, the detection unit 24 is a 2D camera that projects a stationary, substantially planar beam of light across the loading area 14 and collects data on the objects that pass through the beam, such as the bed 20 and the sideboards 22 of the loading area 14. In general, 2D image sensors, or the controller 23, perform grayscale or red-green-blue (RGB) analysis on the pixel data generated based on the reflected light to yield two-dimensional image data of the loading area 14, or viewing field, which can be analyzed by the controller 23 to identify the loading area 14.

In another exemplary embodiment, the detection unit 24 is a three-dimensional (3D) image sensor, also known as time-of-flight (TOF) sensors, that are designed to generate distance information as well as two-dimensional shape information for the loading area 14. In one embodiment, the TOF sensors determine a distance of the loading area 14 using phase shift monitoring techniques, where a beam of light is emitted in the loading area 14, and the measured phase shift of light reflected from the bed 20 and sideboards 22 of the loading area 14 relative to the emitted light is translated to a distance value. In further embodiments, TOF sensors that employ pulsed light illumination measure the elapsed time between emission of a light pulse to the loading area 14 and receipt of a reflected light pulse at the sensor's photo-receiver.

FIG. 3 is a functional block diagram of one example of the work machine system 1 for use in a work machine system. The work machine system 1 includes the detection unit 24 disposed on the work machine 2 for generating a first image data 28 and a second image data 29. As discussed above, the detection unit 24 can provide multiple images of the loading area 14, and the images can include color content, such as red, greed, blue (RGB) content, and depth content. The image data, in color, or black and white, and with depth information, can be provided to the controller 23 for calibration, analysis, and modeling. In one exemplary embodiment, the first image data 28 is image data of the loading area 14 captured by the detection unit 24 at the start of a loading operation, and the second image data 29 is image data of the loading area 14 captured by the detection unit 24 at the end of the loading operation. In another exemplary embodiment, image data, such as the first and second image data 28, 29 are captured during the entirety of the loading operation.

During the loading operation, the loading area 14 is sometimes filled with the materials 13 that have been unloaded. When the loading area 14 is filled, the detection unit 24 is unable to capture complete image data of the loading area 14 that is covered by the materials 13, and instead will capture as much image data of the truck 15 as visibly uncovered by materials 13, and specifically the loading area 14, as possible, including the sideboards 22. Depending on if the loading area 14 is filled during the generating of the first image data 28 or the second image data 29, an indication of damage of the damage of the portion of the loading area 14 that is covered may not be able to be determined until further image data is captured and the 3D object is updated, as discussed below.

According to the embodiments, the image data is transmitted to the controller 23 for analysis and for detecting possible damage to the loading area 14. The received image data is analyzed by software on the controller 23. The analysis may be performed by artificial intelligence, a neural network, or traditional software. The received image data may be analyzed on the basis of, for example, numerical data formed from the image data. The image data may consists of pixels consisting of color values. Software may be applied to process color data, pixel data, geometric data, etc. For example, the analysis software may detect how many pixels of the bed 20 and the sideboards 22 are black and how many are grey. These may be compared with a predetermined limit value. The analysis software may also return information on the number of pixels whose color or value could not be determined. In addition or alternatively, the analysis software may search for a predetermined color of damage, or a color close to it, from the part of the loading area 14 being inspected. Typically, the bed 20 and sideboards 22 are uniformly colored. Detected color deviations may indicate damage, a need for further inspection, dirtiness, paint, or other extra color on the bed 20 and/or the sideboards 22. The analysis software may also recognize patterns, for example a flatness test of the bed 20 and/or sideboards 22. For example, in a flatness test, if there is a point of discontinuity, or protrusion, in any surface of the bed 20 or sideboard, an indication of damage is present.

After the first image data 28 has been analyzed by the controller 23, a 3D object may be generated of it by the controller 23. The 3D object includes a 3D model or representation of the loading area 14 of the truck 15, including all, or partial, surfaces of the bed 20 and the sideboards 22. The database 26 may store the 3D object, or 3D model, of the loading area 14 generated from the first image data 28, for example, a graphical representation or a model depicting the geometry of the loading area 14, such as the bed 20 and/or the sideboards 22. In another exemplary embodiment, the first image data 28 includes image data of the truck 15 and a 3D object of the entire truck 15 is generated.

Later in time than the receiving of the first image data 28, the controller 23 receives the second image data 29, that is generated by the detection unit 24 later in time than the first image data 28. The second image data 29 is analyzed, similar to first image data 28 described above, and the second image data 29 is used to update the 3D object. For example, the received second image data 29 is added to the surface of the 3D object, for example as texture, in the location of the 3D object indicated by the second image data 29. The controller 23 may have an image processing unit 30 for processing and performing the described image analysis of the received first and second image data 28, 29, or identifying the location of said second image data 29 on the 3D object. The controller 23 also may analyze the updated 3D object and detect any indication of damage that occurred between the generating of the first image data 28 and the second image 29 to the loading area 14 from the updated 3D object. An indication of damage being a depth analysis performed to determine if any surface of the 3D object are less flat than when the 3D object was first generated, or a color analysis as described above to determine if any surfaces of the 3D have a different color than when the 3D object was first generated. An indication of damage further may be damage points that are visible in the second image data 29, or the updated 3D object, not present in the first image data 28, or generated 3D object. The image data may include photos captured of the loading area 14 in addition to the depth and color data points of the loading area 14.

After creating the 3D object, the first and second image data 28, 29, the 3D object, any images of the loading area 14 stored in the image data, and/or the updated 3D object are sent from the controller 23 to the display 31. The display 31 may be located in the operator cab 6 on the operator control 35 (FIG. 1) of the work machine 2, or may be located remotely on a computing device (not shown) away from the construction site. On the display 31, the user may zoom in on the 3D object, view the captured images, or review/analyze the image data to determine if any indication of damage is present indicating damage to the loading area 14 that occurred between the generating of the first image data 28 and the second image data 29. In one exemplary embodiment, the controller 23 automatically detects any discrepancies, such as color or depth discrepancies, between the first image data 28 and the second image data 29, or between the 3D object and the updated 3D object, and sends a damage signal 36 to the display 31. The damage signal 31, alerting the user that damage may have occurred to the loading area 14 between the generating of the first image data 28 and the second image data 29. In another exemplary embodiment, when the damage signal 31 is sent to the operator control 35, the operator control 35 illuminating a signal, such as a status light, or showing on the display 31 in the operator cab 6, that damage may have occurred.

In another exemplary embodiment, when the first image data 28 and the second image data 29 are generated by the detection unit 24, the image data is associated with an operator identification configured to identify the operator using the work machine 2 at the time the first image data 28 is generated, and at the time the second image data 29 is generated. The operator identification may be a RFID (radio frequency identification) key fob that the operator scans in at the operator control 35 of the work machine 2 at the start or end of the loading operation, or may be, for example, a password or identification the operator of the work machine 2 enters into the operator control 35 at the start or end of the loading operation.

Further, the first image data and/or the second image data 29 may be associated with a truck identification. For example, during the generating of the first image data 28 and the second image data 29, the controller may identify characteristics of the truck 15, such as the truck license plate number (from the image data or an image, such as a focused imaged, captured of the truck license plate), create a unique truck identification from said identified characteristics, and associate said image data with the truck characteristics when storing the image data on the database 26 or sending the image data to the display 31. In another example, at least one pattern recognition algorithm for recognizing features in an image or focused image of the truck 15 taken by the detection unit 24, or recognizing features in the image data, is used to create the truck identification.

Additionally, the first image data 28 and the second image data 29 may each independently be associated with an operator identification and/or truck identification. This allows the user reviewing the identification of any damage to the loading area to determine which operator was operating the work machine 2 when the first image data 28 is generated and when the second image data 29 is generated, as well as determine which truck 15 was the work machine 15 unloading into when the first image data 28 is generated as well as when the second image data 29 is generated. The truck identification and the operator identification can be stored on the database as a record with their associated image data, and the record may further include captured images of the loading area 14 captured during the generating of the first image data 28 and the second image data 29.

In another exemplary embodiment, the 3D object is supplemented with the indication of damage detected on the basis of the image analysis of the second image data 29. The corresponding data may be presented in a written report and/or list. The location of the damage is displayed in the 3D object, and it may be visible on any of the surfaces of the 3D object, including the bed 20 and the sideboards 22. The 3D object includes image data on the loading area 14 and the results of the analysis on possible damage and other aspects analyzed. The 3D object may be displayed to a user who may examine the object three-dimensionally, rotate it and zoom it in and out. Furthermore, the user may be shown a specific part of the object seen from different angles or directions, next to each other.

Figure 4:
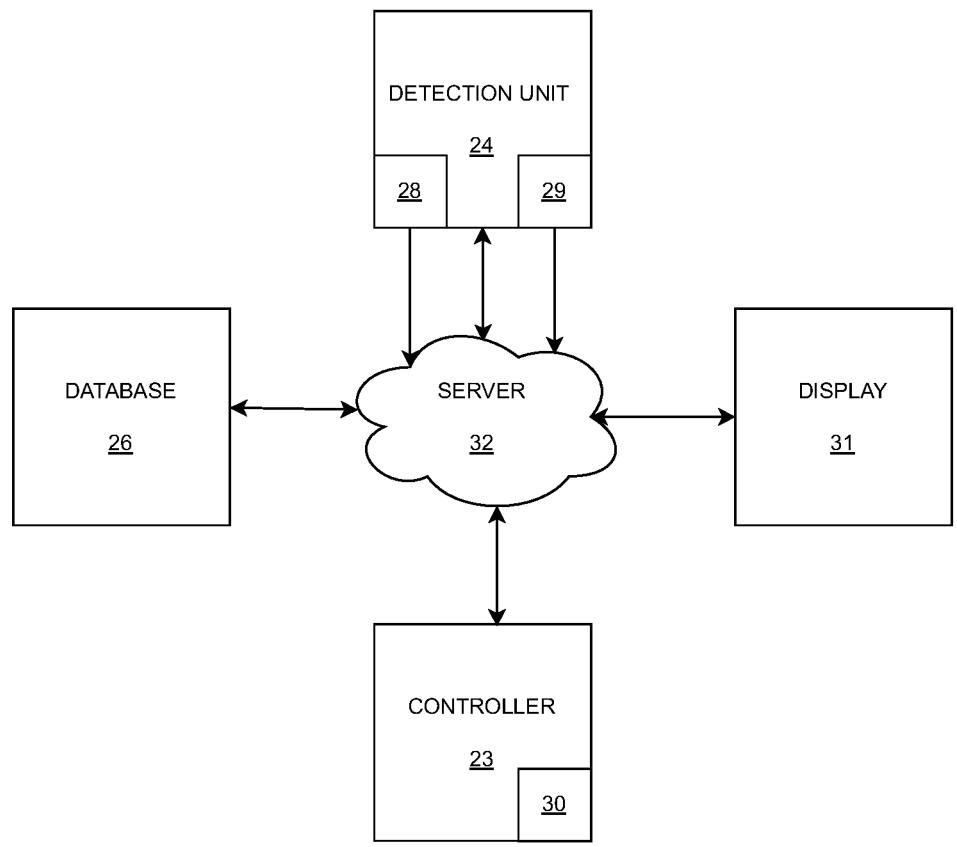
FIG. 4 is a block diagram of an exemplary work machine system being connected by a server, in accordance with the present disclosure.

Turning to FIG. 4, in one exemplary embodiment, the detection unit 14 is located on the work machine 2 and is in operative connection with the controller 23. The controller 23 may be located on the work machine 23, but may also be located remotely from the work machine 23, such as in operative communication via the internet or the controller 23 is located/in operative communication with the detection unit 24 of the work machine 2 on a server 32 or a cloud server. In these embodiments, the image data is sent to the controller by a transceiver located on the work machine 2. Further, the database 26 may be located on the work machine 2 or may be on the server 32 or a cloud server (or in operative communication with the server 32) and is in operative connection with the controller 23 via said server 32. The display 31, in the FIG. 4 embodiment, is in operative communication with the controller 23 and the database 26 via the server 32.

INDUSTRIAL APPLICABILITY

In general, the teachings of the present disclosure may find applicability in many industries including, but not limited to, construction machines or the like. More specifically, the teachings of the present disclosure may find applicability in any damage detection control systems.

In accordance with the scope of the present disclosure, in one such operation it is desirable to detect if any damage has occurred to a loading area of a truck caused by a digging machine, such as an excavator, during a loading operation. Specifically, sometimes a truck is damaged during a loading operation and the wrong digging machine, or work machine, is attributed for causing the damage.

Figure 5:
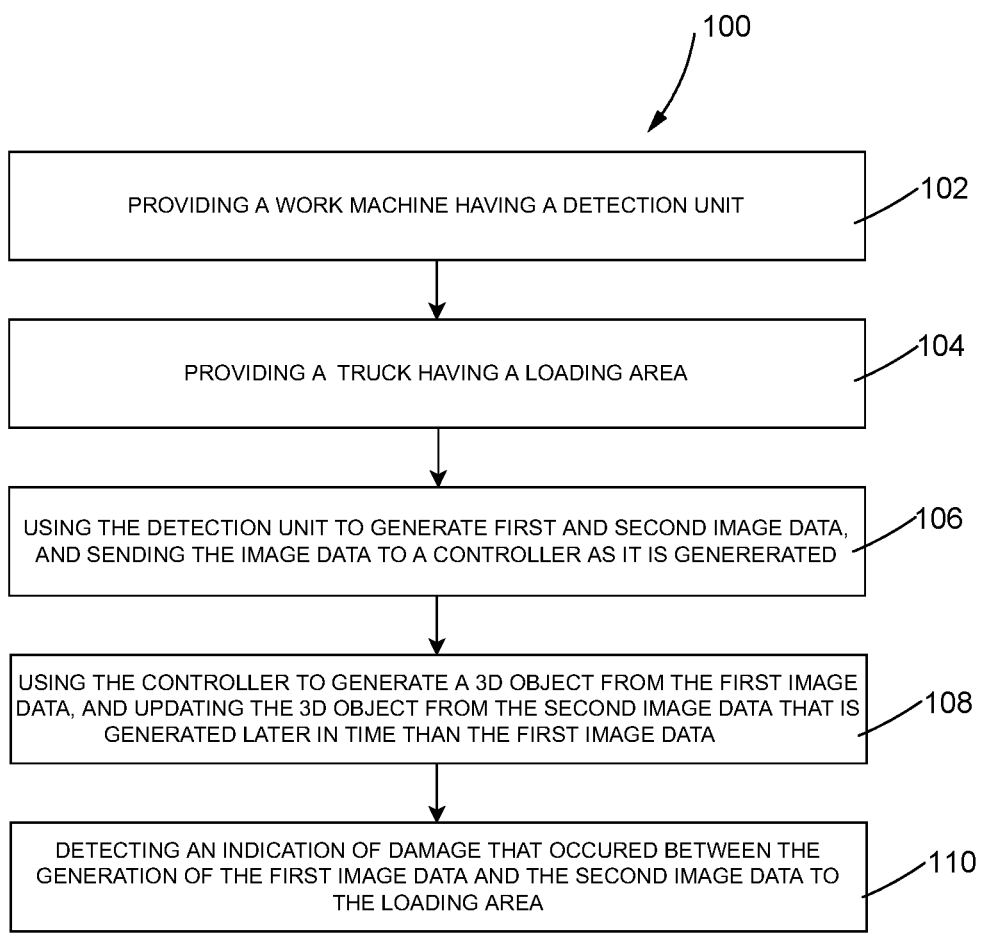
FIG. 5 is a flow chart illustrating a method of detecting damage of a loading area using a work machine system, in accordance with the present disclosure.

Turning now to FIG. 5, with continued reference to FIGS. 1-4, a flowchart illustrating an exemplary method 100 for detecting damage to a truck from a detection unit on a work machine. At block 102, a work machine 2 is provided that has a detection unit 24 configured to generate a first image data 28 and a second image data 29 of a loading area 14 of a truck 14. At block 104 the truck is provided having the loading area 14. At block 106, the detection unit 24 is used to generate the first image data 28 and the second image data 29, where the image data is sent to a controller 23 as it is generated. At block 108, the controller generates a 3D object from the first image data 28, and updated the 3D object from the second image data 29 that is generated later in time than the first image data 28. At block 110, the controller 23 detection any indication of damage that occurred to the loading area 14 between the generating of the first image data 28 and the second image data 29 to the loading area 14.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A work machine control system for detecting truck damage, the system comprising:
    a work machine having a detection unit disposed on the work machine configured to generate a first image data and a second image data of a loading area of a truck, the work machine configured to deposit earth material into the loading area; and
    a controller configured to receive the first image data, generate a 3D object from the received first image data, receive the second image data that is generated later in time than the first image data, update the 3D object with the second image data, and detect any indication of damage that occurred between the generating of the first image data and the second image data to the loading area from the updated 3D object.

2. The system of claim 1, in which the loading area includes the sideboards and bed of the truck.

3. The system of claim 1, in which an indication of damage being damage points that are visible in the second image data or the updated 3D object not present in the first image data or generated 3D object.

4. The system of claim 1, in which the detection unit is one of the following: a 2D camera, a 3D stereo camera, a LiDar camera, an ultrasonic distance sensing sensor, or a millimeter-wave radar.

5. The system of claim 1, in which the first image data and the second image data includes pictures of the loading area.

6. The system of claim 5, in which the controller is in operative communication with a memory.

7. The system of claim 6, in which the first image data and the second image data are stored on the memory, and the first image data is associated with an operator identification that is configured to identify the operating using the work machine at the start of a loading operation when the first image data is generated.

8. The system of claim 6, in which the second image data is associated with an operator identification that is configured to identify the operator using the work machine at the end of a loading operation when the second image data is generated.

9. The system of claim 6, in which the first and second image data are associated with a truck identification.

10. The system of claim 1, in which the detection unit is operatively connected to a transceiver, and the transceiver is operatively connected with a server having the controller.

11. The system of claim 1, in which the controller is on the work machine.

12. The system of claim 1, in which the work machine is an excavator, the first image data is generated at the start of a loading operation and the second image data is generated at the end of the loading operation.

13. The system of claim 12, in which if damage is detected after updating the 3D object, the controller generating a record of the loading operation.

14. The system of claim 13, in which the record includes images of the loading area from the first image data and the second image data, the 3D object, and the updated 3D object showing the indication of damage.

15. The system of claim 14, in which the first image data and second image data are associated with a unique operator ID and a unique truck ID, the unique operator ID configured to identify an operator of the work machine during the loading operation, and the truck ID configured to identify the truck from which the image data was generated.

16. The system of claim 15, in which the truck ID is generated from an image of a truck license plate captured by detection unit and stored on a memory.

17. The system of claim 1, the controller comprising at least one pattern recognition algorithm for recognizing features in a focused image taken by the detection unit, the first image data, the second image data, the 3D object, or the updated 3D object.

18. A work machine system comprising:
a work machine having a working tool that is movable to adjust a dig depth into a terrain during a dig cycle, and a detection unit disposed on the work machine configured to generate a first image data and a second image data of a loading area;
a truck having the loading area, the loading area configured to receive earth material from the working tool; and
a controller configured to receive the first image data, generate a 3D object from the received first image data, receive the second image data generated later in time than the first image data, update the 3D object with the second image data, and detect any indication of damage that occurred between the generating of the first image data and the second image data to the loading area from the updated 3D object.

19. The work machine system of claim 18, in which the work machine is an autonomous vehicle.

20. A method of detecting damage to a loading area of a truck, the method comprising:
providing a work machine having a detection unit disposed on the work machine configured to generate a first image data and a second image data of the loading area of the truck, the work machine being configured to deposit earth material into the loading area;
receiving at a controller the first image data;
generating with the controller a 3D object from the received first image data;
receiving at the controller the second image data that is generated later in time that the first image data;
updating with the controller the 3D object with the second image data; and
detecting with the controller any indication of damage that occurred between the generation of the first image data and the second image data to the loading area from the updated 3D object.

* * * * *